US009432804B2

(12) United States Patent
Hanson et al.

(10) Patent No.: US 9,432,804 B2
(45) Date of Patent: Aug. 30, 2016

(54) PROCESSING OF PRE-STAGED TRANSACTIONS

(71) Applicant: Bank of America Corporation, Charlotte, NC (US)

(72) Inventors: Carrie Anne Hanson, Charlotte, NC (US); Don Cardinal, San Antonio, TX (US); Sharon Scanlon, Manahawkin, NJ (US); Davindar Gill, Palentine, IL (US); Alicia C. Jones, Fort Mill, SC (US); Russell Lewis, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/327,847

(22) Filed: Jul. 10, 2014

(65) Prior Publication Data

US 2016/0014552 A1    Jan. 14, 2016

(51) Int. Cl.
*G06Q 40/00* (2012.01)
*H04W 4/02* (2009.01)
*G06Q 20/32* (2012.01)
*G06Q 20/40* (2012.01)
*G06Q 20/10* (2012.01)

(52) U.S. Cl.
CPC .......... *H04W 4/02* (2013.01); *G06Q 20/3224* (2013.01); *G06Q 20/40* (2013.01); *G06Q 20/108* (2013.01)

(58) Field of Classification Search
CPC .............. H04W 4/00–4/046; H04W 4/26; H04W 64/00–64/006; G06Q 20/00; G06Q 20/10; G06Q 20/102; G06Q 20/12; G06Q 20/16; G06Q 20/30–20/3278; G06Q 20/105; G06Q 20/108; G06Q 20/40

USPC ................. 235/380, 494, 379, 487
See application file for complete search history.

(56) References Cited

U.S. PATENT DOCUMENTS

| | | | |
|---|---|---|---|
| 5,581,630 A | 12/1996 | Bonneau, Jr. | |
| 5,991,749 A | 11/1999 | Morrill, Jr. | |
| 6,513,015 B2 | 1/2003 | Ogasawara | |
| 6,738,628 B1 | 5/2004 | McCall et al. | |
| 6,845,361 B1 | 1/2005 | Dowling | |
| 7,047,560 B2 | 5/2006 | Fishman et al. | |
| 7,111,174 B2 | 9/2006 | Hamid | |
| 7,149,533 B2 | 12/2006 | Laird et al. | |
| 7,536,316 B2 | 5/2009 | Ozer et al. | |

(Continued)

FOREIGN PATENT DOCUMENTS

KR    20090050383 A    5/2009

*Primary Examiner* — San Htun
(74) *Attorney, Agent, or Firm* — Banner & Witcoff, Ltd.; Michael A. Springs

(57) ABSTRACT

Systems and methods for using proximity positioning systems to determine an identity and location of a user, and process a pre-staged transaction based on the determined information are provided. In some examples, a transaction may be initiated by a user. A financial institution may pre-process the transaction and, upon establishing a physical presence of the user at a banking center, may further process and/or complete the transaction. The physical presence of the user may be established based on a signal from a location beacon at the banking center being detected by a personal computing device of the user. Because the personal computing device is within a predefined proximity of the location beacon in order to detect the signal, the location of the location beacon, and, thus the personal computing device may be determined, and an identity of the user may be determined.

20 Claims, 12 Drawing Sheets

(56) References Cited

U.S. PATENT DOCUMENTS

| | | |
|---|---|---|
| 7,536,722 B1 | 5/2009 | Saltz et al. |
| 7,543,738 B1 | 6/2009 | Saunders et al. |
| 7,712,657 B1 * | 5/2010 | Block et al. .................. 235/379 |
| 7,774,076 B2 | 8/2010 | Skowronek |
| 7,814,016 B2 | 10/2010 | Pranger |
| 7,904,718 B2 | 3/2011 | Giobbi et al. |
| 7,911,334 B2 | 3/2011 | Busey |
| 7,912,843 B2 | 3/2011 | Murdock et al. |
| 7,979,899 B2 | 7/2011 | Guo et al. |
| 8,009,013 B1 | 8/2011 | Hirschfeld et al. |
| 8,055,551 B2 | 11/2011 | Milgramm et al. |
| 8,073,460 B1 | 12/2011 | Scofield et al. |
| 8,091,778 B1 | 1/2012 | Block et al. |
| 8,145,649 B2 | 3/2012 | Murdock et al. |
| 8,186,578 B1 | 5/2012 | Block et al. |
| 8,201,729 B1 | 6/2012 | Block et al. |
| 8,229,787 B2 | 7/2012 | Ramchandani et al. |
| 8,259,692 B2 | 9/2012 | Bajko |
| 8,260,707 B2 | 9/2012 | Treadwell et al. |
| 8,295,898 B2 | 10/2012 | Ashfield et al. |
| 8,332,232 B2 | 12/2012 | Nickerson et al. |
| 8,369,266 B2 | 2/2013 | Jin et al. |
| 8,401,897 B1 | 3/2013 | Chatterjee |
| 8,413,891 B2 | 4/2013 | Long |
| 8,467,768 B2 | 6/2013 | Mahaffey et al. |
| 8,583,933 B2 | 11/2013 | Granbery |
| 8,590,028 B2 | 11/2013 | Saxena et al. |
| 8,606,712 B2 | 12/2013 | Choudhuri et al. |
| 8,666,821 B2 | 3/2014 | Xie et al. |
| 8,671,001 B1 | 3/2014 | Thompson et al. |
| 8,742,894 B2 | 6/2014 | Seydoux |
| 9,204,257 B1 | 12/2015 | Mendelson |
| 2006/0119469 A1 | 6/2006 | Hirai et al. |
| 2007/0186258 A1 | 8/2007 | Dapper et al. |
| 2007/0186261 A1 | 8/2007 | Geile et al. |
| 2007/0192815 A1 | 8/2007 | Geile et al. |
| 2007/0195689 A1 | 8/2007 | Dapper et al. |
| 2007/0195901 A1 | 8/2007 | Geile et al. |
| 2007/0195902 A1 | 8/2007 | Geile et al. |
| 2007/0201573 A1 | 8/2007 | Geile et al. |
| 2007/0206693 A1 | 9/2007 | Geile et al. |
| 2008/0052151 A1 | 2/2008 | Xie et al. |
| 2008/0114697 A1 | 5/2008 | Black et al. |
| 2009/0252318 A1 | 10/2009 | Smith et al. |
| 2009/0259499 A1 | 10/2009 | Bhojwani et al. |
| 2009/0328052 A1 | 12/2009 | Nguyen et al. |
| 2009/0328182 A1 | 12/2009 | Malakapalli et al. |
| 2010/0017874 A1 | 1/2010 | Piccinini et al. |
| 2010/0042541 A1 | 2/2010 | Kang et al. |
| 2010/0191581 A1 | 7/2010 | Furin et al. |
| 2010/0198725 A1 * | 8/2010 | Naccache ....................... 705/41 |
| 2010/0205063 A1 * | 8/2010 | Mersky ............... G06Q 20/02 705/17 |
| 2010/0277276 A1 | 11/2010 | Bayne et al. |
| 2010/0287250 A1 | 11/2010 | Carlson et al. |
| 2011/0086646 A1 | 4/2011 | Gupta et al. |
| 2011/0202377 A1 | 8/2011 | Maiya et al. |
| 2011/0208657 A1 | 8/2011 | Rao |
| 2011/0246306 A1 | 10/2011 | Blackhurst et al. |
| 2011/0313804 A1 | 12/2011 | Camp et al. |
| 2011/0321031 A1 | 12/2011 | Dournov et al. |
| 2012/0004769 A1 | 1/2012 | Hallenbeck et al. |
| 2012/0047072 A1 | 2/2012 | Larkin |
| 2012/0070041 A1 | 3/2012 | Wang |
| 2012/0076183 A1 | 3/2012 | Dapper et al. |
| 2012/0078673 A1 | 3/2012 | Koke et al. |
| 2012/0078741 A1 | 3/2012 | DeLine |
| 2012/0116929 A1 | 5/2012 | Gventer et al. |
| 2012/0130840 A1 | 5/2012 | Carlier et al. |
| 2012/0136479 A1 | 5/2012 | Signorelli et al. |
| 2012/0143755 A1 | 6/2012 | Burrell |
| 2012/0158297 A1 | 6/2012 | Kim et al. |
| 2012/0195184 A1 | 8/2012 | Dapper et al. |
| 2012/0197773 A1 | 8/2012 | Grigg et al. |
| 2012/0197797 A1 | 8/2012 | Grigg et al. |
| 2012/0197798 A1 | 8/2012 | Grigg et al. |
| 2012/0203892 A1 | 8/2012 | Pignataro et al. |
| 2012/0271692 A1 | 10/2012 | Huang et al. |
| 2012/0278115 A1 | 11/2012 | Acharya et al. |
| 2012/0278234 A1 | 11/2012 | Dent et al. |
| 2012/0320199 A1 | 12/2012 | Kundu et al. |
| 2012/0320214 A1 | 12/2012 | Kundu et al. |
| 2012/0321146 A1 | 12/2012 | Kundu et al. |
| 2012/0323642 A1 | 12/2012 | Camp et al. |
| 2013/0005253 A1 | 1/2013 | Grigg et al. |
| 2013/0030915 A1 | 1/2013 | Statler et al. |
| 2013/0045758 A1 | 2/2013 | Khorashadi et al. |
| 2013/0048724 A1 | 2/2013 | Burnside et al. |
| 2013/0104214 A1 | 4/2013 | Beck et al. |
| 2013/0121131 A1 | 5/2013 | Dapper et al. |
| 2013/0138497 A1 | 5/2013 | Yan et al. |
| 2013/0150006 A1 | 6/2013 | Nunally et al. |
| 2013/0159195 A1 | 6/2013 | Kirillin et al. |
| 2013/0165154 A1 | 6/2013 | Joshi |
| 2013/0173387 A1 | 7/2013 | Adelaar |
| 2013/0173404 A1 | 7/2013 | Scipioni |
| 2013/0173492 A1 | 7/2013 | Leavenworth et al. |
| 2013/0182114 A1 | 7/2013 | Zhang et al. |
| 2013/0182904 A1 | 7/2013 | Zhang et al. |
| 2013/0203383 A1 | 8/2013 | Stopel et al. |
| 2013/0211718 A1 | 8/2013 | Yoo et al. |
| 2013/0217416 A1 | 8/2013 | Matthews, III et al. |
| 2013/0238497 A1 * | 9/2013 | Ramachandran ...... G06Q 20/36 705/41 |
| 2013/0246301 A1 | 9/2013 | Radhakrishnan et al. |
| 2013/0253818 A1 | 9/2013 | Sanders et al. |
| 2013/0261964 A1 | 10/2013 | Goldman et al. |
| 2013/0275163 A1 | 10/2013 | Kaiser |
| 2013/0282744 A1 | 10/2013 | Hartman et al. |
| 2013/0297422 A1 | 11/2013 | Hunter et al. |
| 2013/0300541 A1 | 11/2013 | Pesonen et al. |
| 2013/0310081 A1 | 11/2013 | Chu |
| 2013/0317778 A1 | 11/2013 | Gupta et al. |
| 2013/0325587 A1 | 12/2013 | Kothari et al. |
| 2013/0328725 A1 | 12/2013 | Wuoti et al. |
| 2013/0332271 A1 | 12/2013 | Hay |
| 2013/0346189 A1 | 12/2013 | Isaacs |
| 2014/0006219 A1 | 1/2014 | Wouhaybi et al. |
| 2014/0020073 A1 | 1/2014 | Ronda et al. |
| 2014/0032297 A1 | 1/2014 | Germann et al. |
| 2014/0032345 A1 | 1/2014 | Moore |
| 2014/0039950 A1 | 2/2014 | Appel et al. |
| 2014/0039951 A1 | 2/2014 | Appel et al. |
| 2014/0046830 A1 | 2/2014 | Orozco et al. |
| 2014/0058914 A1 | 2/2014 | Song et al. |
| 2014/0068785 A1 | 3/2014 | Gventer et al. |
| 2014/0074800 A1 | 3/2014 | Gventer et al. |
| 2014/0105263 A1 | 4/2014 | Geile |
| 2014/0110481 A1 | 4/2014 | Burnside et al. |
| 2014/0114877 A1 | 4/2014 | Montano |
| 2014/0201025 A1 | 7/2014 | Adoni et al. |
| 2014/0222603 A1 | 8/2014 | Hay |
| 2014/0258028 A1 | 9/2014 | Bynum et al. |
| 2014/0270108 A1 | 9/2014 | Riahi et al. |
| 2014/0270109 A1 | 9/2014 | Riahi et al. |
| 2014/0270146 A1 | 9/2014 | Riahi et al. |
| 2014/0279450 A1 | 9/2014 | Gujral |
| 2014/0297527 A1 * | 10/2014 | McLaughlin ...... G06Q 20/3224 705/44 |
| 2014/0309770 A1 | 10/2014 | Signorelli et al. |
| 2015/0059002 A1 | 2/2015 | Balram et al. |
| 2015/0089585 A1 * | 3/2015 | Novack ............................. 726/3 |

* cited by examiner

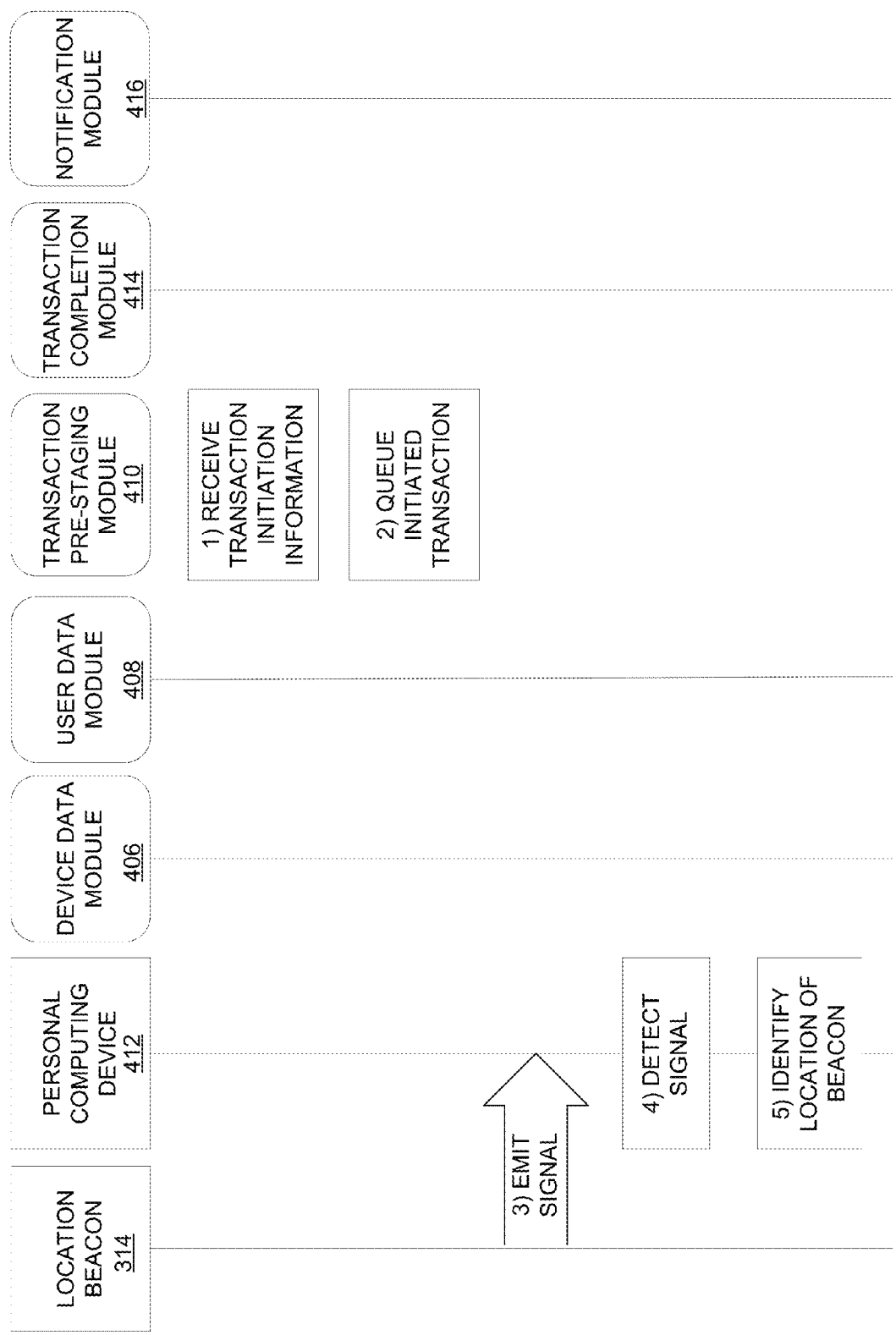

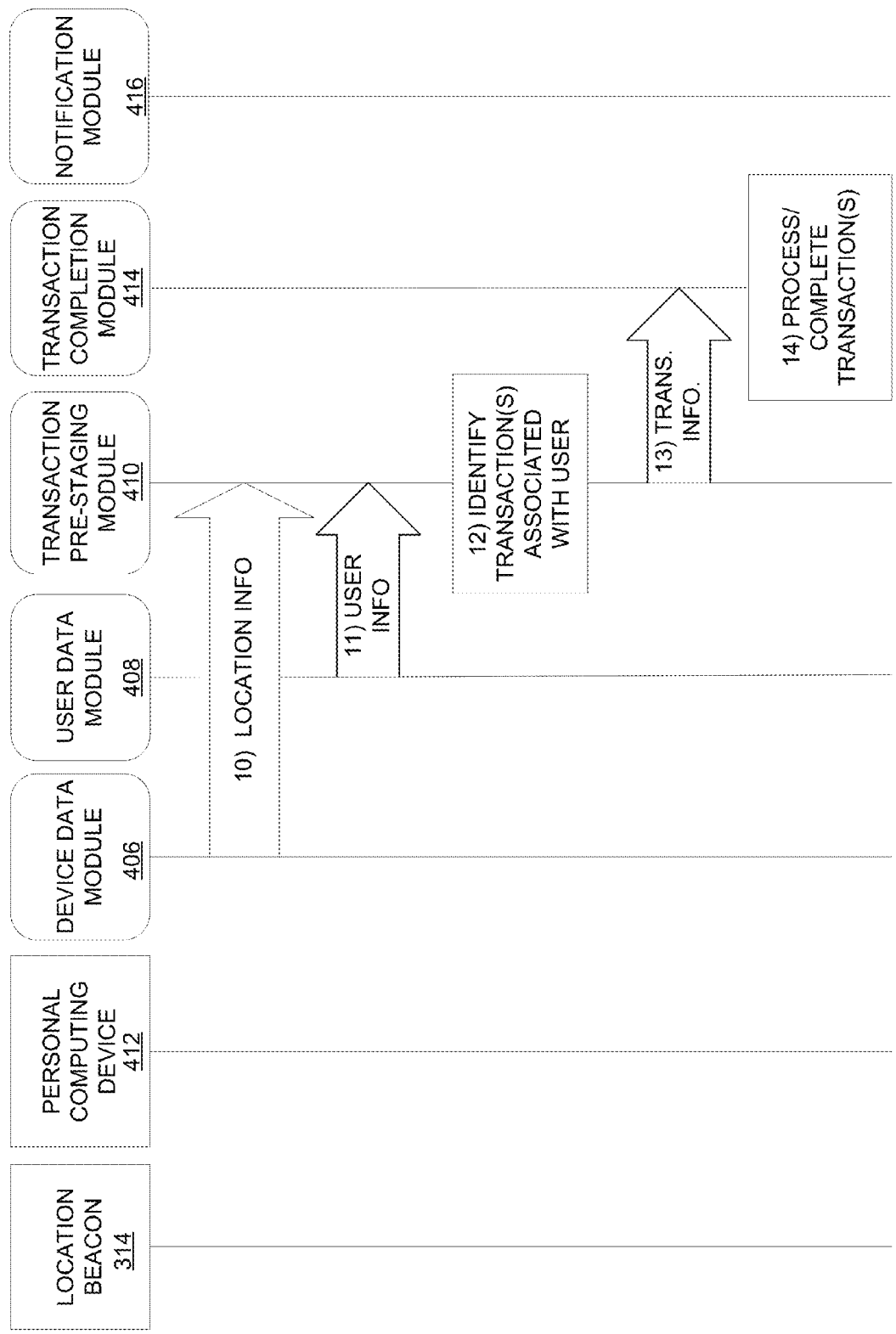

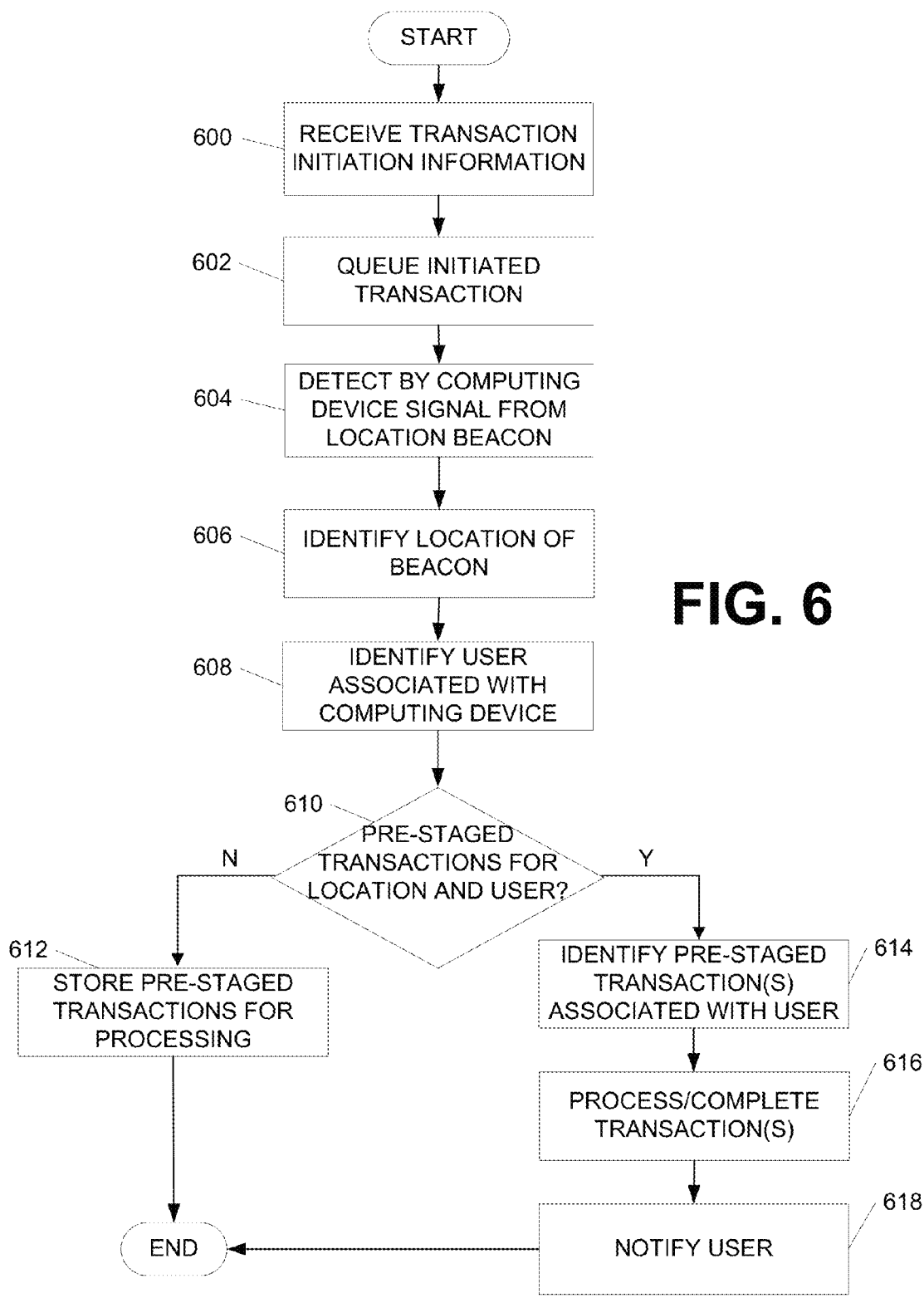

PROCESSING OF PRE-STAGED TRANSACTIONS

BACKGROUND

Companies that have a service component are often looking for ways to improve the experience that customers have when interacting with the company or its representatives, associates, and the like. Given the hectic schedules of people these days, it is important to provide efficient and effective customer service or assistance. Accordingly, companies, financial institutions and other entities are often looking for ways to pre-process or conduct any transaction steps or processes in advance of the customer's arrival at the banking center or retail location.

SUMMARY

Aspects of the disclosure relate to various systems, methods, apparatuses, and computer-readable media configured to use proximity positioning systems to determine a location of a user, identify the user and provide additional services and/or functionality based on the determined location and/or identity. In some examples, a signal may be received or detected. The signal may be a low-power radio signal detectable within a predefined proximity and emitted from a locating beacon. The signal may, in some examples, be detected by a personal computing device of a user. The location of the beacon, and the device detecting the signal, may be determined (e.g., based on previously stored location information associated with the beacon). The location information, as well as a unique identifier associated with the personal computing device of the user, may be used to identify a user associated with the personal computing device and the location of the user. This information may be used to provide additional services and/or functionality to the user.

For instance, in some arrangements, a user may pre-stage or initiate a transaction from a computing device at a location other than a banking center or branch (e.g., the banking center or branch at which the location beacon is located. Upon the user's arrival at the banking center, a personal computing device of the user may detect the signal associated with the location beacon and the location of the personal computing device and identity of the user associated with the personal computing device may be determined. Based on this information, a physical presence of the user may be established and the pre-staged or initiated transaction may be processed further or completed. For instance, the determination of the location and identity of the user establish a physical presence at the banking center which may, in some arrangements, be sufficient information to authorize continued processing or completion of a pre-staged transaction. A notification may then be transmitted to the user (e.g., the personal computing device of the user) indicating that the transaction has been processed and/or completed and providing any additional instructions to the user.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 5A-5D depict an illustrative event sequence for receiving transaction initiation information, identifying a location of a personal computing device of a user, identifying a user associated with the personal computing device and processing and/or completing the initiated transaction based on the determined location and identity information according to one or more aspects discussed herein;

FIG. 6 illustrates one example method of receiving pre-staged transaction information and processing or completing the transaction upon establishing a physical presence of the user at a banking center according to one or more aspects discussed herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
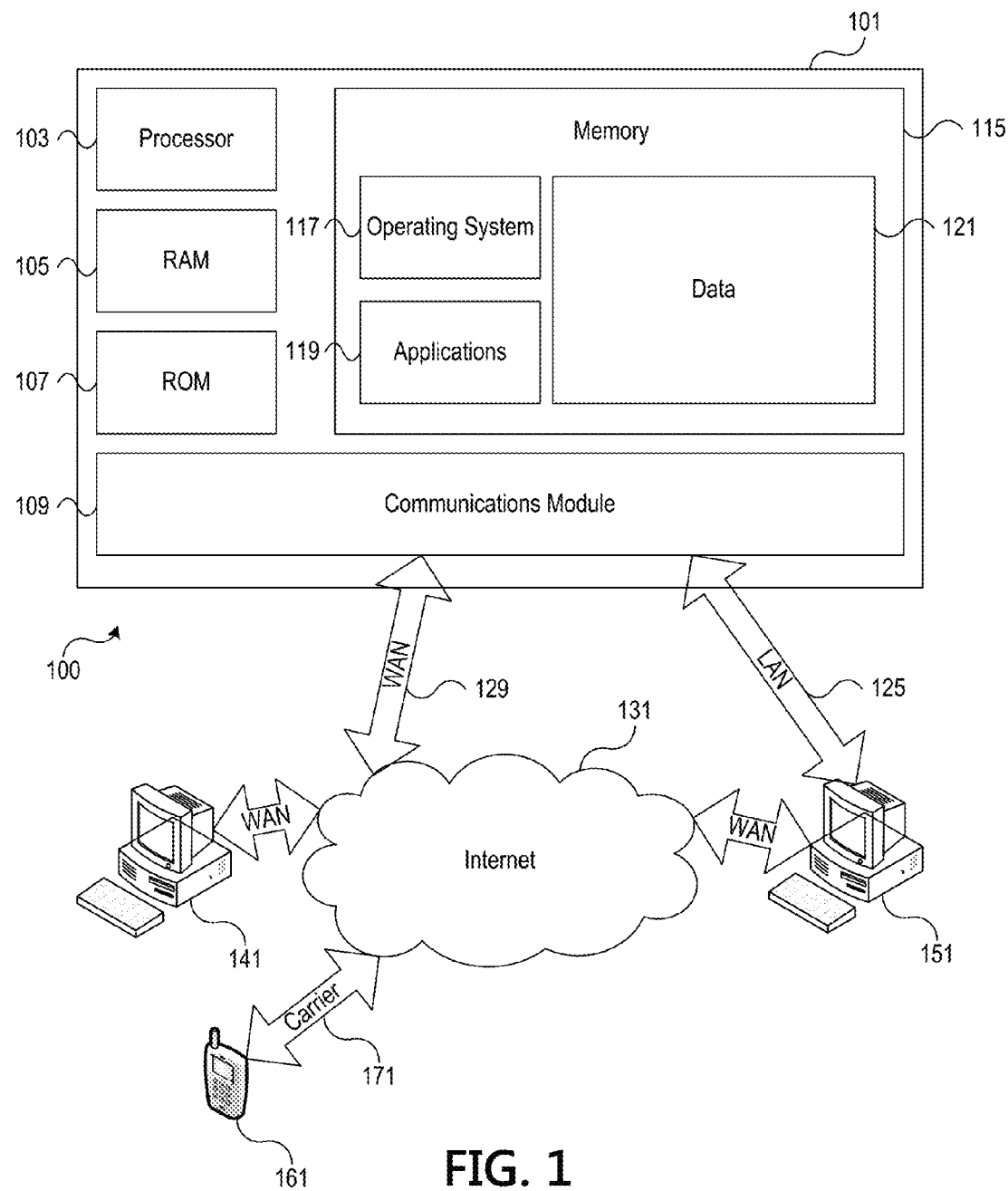
FIG. 1 depicts an illustrative operating environment in which various aspects of the disclosure may be implemented in accordance with one or more aspects discussed herein.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
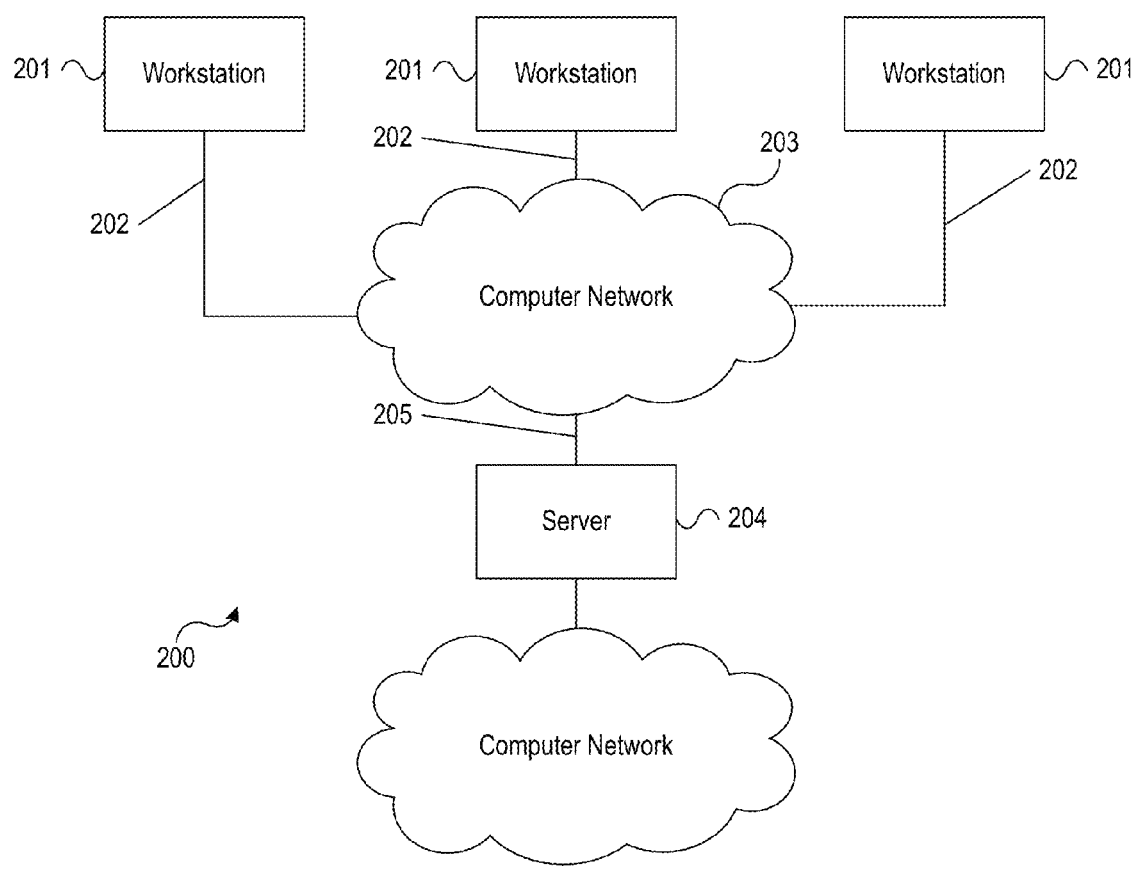
FIG. 2 depicts an illustrative block diagram of workstations and servers that may be used to implement the processes and functions of certain aspects of the present disclosure in accordance with one or more aspects discussed herein.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
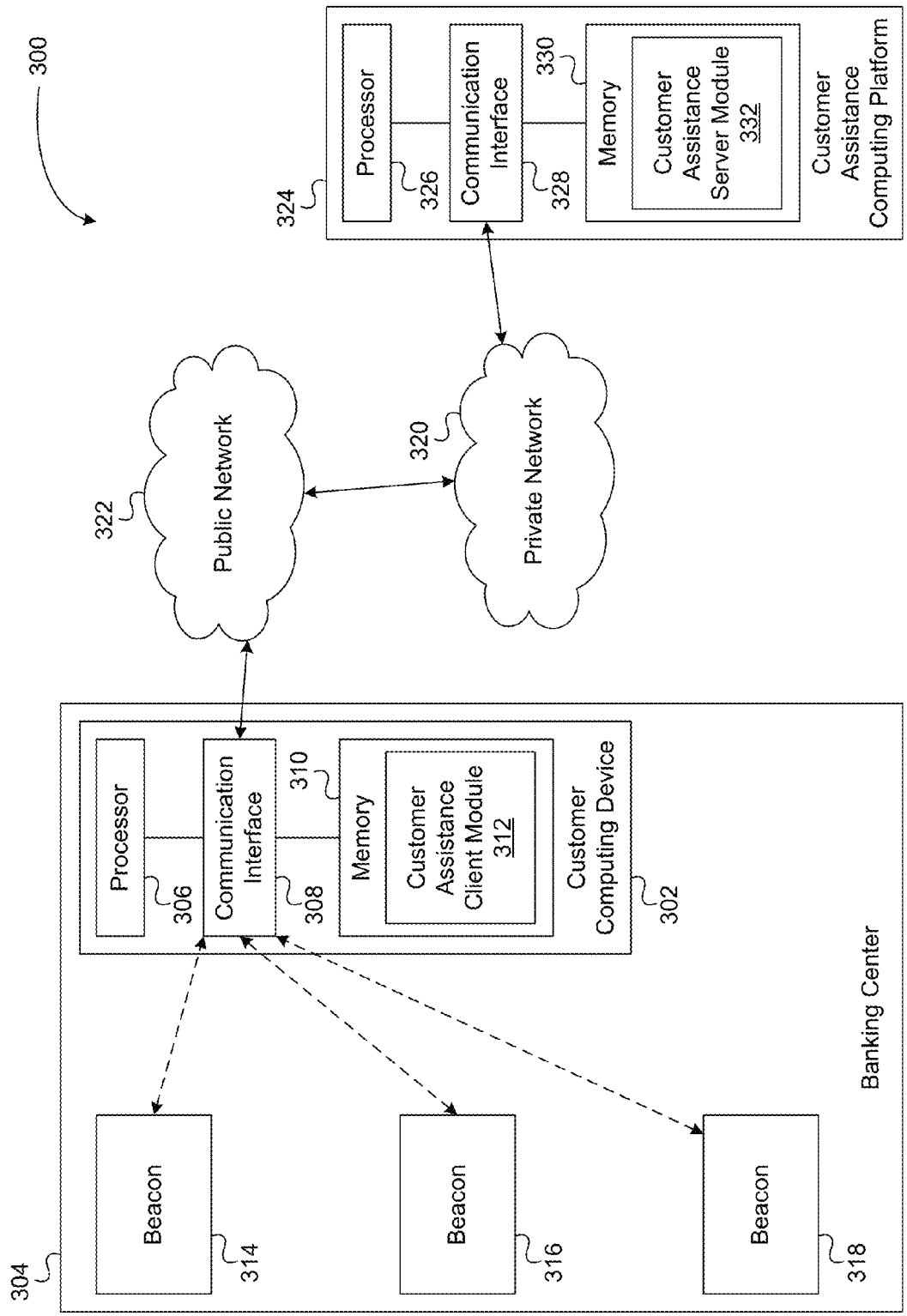
FIG. 3 depicts an illustrative computing environment for a proximity positioning system that may be used to provide location determination and user identification in accordance with one or more aspects discussed herein.

FIG. 3 depicts an illustrative computing environment for a location determination and user identification system in accordance with one or more example embodiments. Referring to FIG. 3, computing environment 300 may include one or more computing devices, such as customer computing device 302. Customer computing device 302 may be any type of computing device capable of receiving a user interface, receiving input via the user interface, and communicating the received input to one or more other computing devices. For example, customer computing device 302 may be a desktop computer, laptop computer, tablet computer, smart phone, or the like. In one or more arrangements, customer computing device 302 may be a personal computing device (e.g., a smart phone, a tablet computer, or any other type of mobile device) that belongs to and/or is used by a customer of a financial institution at and/or near a banking center 304 and/or any other location operated by, controlled by, and/or otherwise associated with the financial institution.

Computing environment 300 also may include one or more location beacons, such as location beacon 314, location beacon 316, and location beacon 318. Each location beacon (e.g., location beacon 314, location beacon 316, and location beacon 318) may be configured to transmit one or more radio signals that may be detected and/or received by other devices located in close proximity of and/or otherwise within a predetermined distance of the particular location beacon. In one or more embodiments, any and/or all of the location beacons included in computing environment 300 (e.g., location beacon 314, location beacon 316, and location beacon 318) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location where the location beacon is positioned.

For example, in one or more arrangements discussed below, the one or more location beacons (e.g., location beacon 314, location beacon 316, and location beacon 318) may be positioned at and/or near banking center 304, and may be specifically positioned at and/or near different areas of banking center 304, such as at a welcome area, at a teller counter or window, at a waiting area, at an external alcove where an automated teller machine (ATM) is located, at an external window where drive-up services are provided, at a parking lot, and/or in one or more other distinct areas of banking center 304. In addition, each location beacon may transmit a radio signal that may be detected and/or received by other devices at banking center 304, such as customer computing device 302, which may enable such devices to determine that they are present at banking center 304 and/or located at and/or near a particular area of banking center 304.

In one or more embodiments, customer computing device 302 may include at least one processor 306, communication interface 308, and/or memory 310. A data bus may interconnect processor 306, communication interface 308, and/or memory 310. Memory 310 may include one or more program modules comprising instructions that when executed by processor 306 cause customer computing device 302 to perform one or more functions described herein. For example, memory 310 may include customer assistance client module 312, which may include instructions that when executed by processor 306 cause customer computing device 302 to perform one or more functions described herein. Communication interface 308 may include one or more wired and/or wireless communication interfaces (e.g., network interfaces, radio interfaces, or the like) that are configured to support communication between customer computing device 302 and one or more other devices and/or networks. In one or more arrangements, communication interface 308 may include at least one network interface that facilitates communication between customer computing device 302 and one or more devices and/or networks that are located remotely from banking center 304, and communication interface 308 may further include at least one radio interface that facilitates communication between and/or enables customer computing device 302 to receive wireless radio signals from one or more location beacons (e.g., location beacon 314, location beacon 316, and location beacon 318) and/or other radio transmitters that may be located at and/or near banking center 304.

Computing environment 300 also may include one or more computing platforms. For example, computing environment 300 may include customer assistance computing platform 324. Customer assistance computing platform 324 may include one or more computing devices configured to perform one or more of the functions described herein. For example, customer assistance computing platform 324 may include one or more computers (e.g., laptop computers, desktop computers, servers, server blades, or the like).

Computing environment 300 also may include one or more networks, which may interconnect customer computing device 302, customer assistance computing platform 324, and/or one or more other computing devices. For example, computing environment 300 may include private network 320 and public network 322. Private network 320 and/or public network 322 may include one or more subnetworks (e.g., LANs, WANs, or the like). Private network 320 may be associated with a particular organization (e.g., a corporation, financial institution, educational institution, governmental institution, or the like) and may interconnect one or more computing devices associated with the organization. For example, customer assistance computing platform 324 may be associated with an organization, such as the financial institution that operates, controls, and/or is otherwise associated with banking center 304, and private network 320 may be operated by and/or otherwise associated with the organization, and may include one or more networks (e.g., LANs, WANs, VPNs, or the like) that interconnect customer assistance computing platform 324 and one or more other computing devices associated with the organization. Public network 322 may connect private network 320 and/or one or more computing devices connected thereto (e.g., customer assistance computing platform 324) with one or more networks and/or computing devices that are not associated with the organization. For example, customer computing device 302 might not be associated with the organization that operates and/or is associated with private network 320, and public network 322 may include one or more networks (e.g., the Internet) that connect customer computing device 302 to private network 320 and/or one or more computing devices connected thereto (e.g., customer assistance computing platform 324).

Customer assistance computing platform 324 may include at least one processor 326, communication interface 328, and/or memory 330. Memory 330 may include one or more program modules comprising instructions that when executed by processor 326 cause customer assistance computing platform 324 to perform one or more functions described herein. For example, memory 330 may include customer assistance server module 332, which may include instructions that when executed by processor 326 cause customer assistance computing platform 324 to perform one or more functions described herein. Communication interface 328 may include one or more wired and/or wireless communication interfaces (e.g., network interfaces, radio interfaces, or the like) that are configured to support communication between customer assistance computing platform 324 and one or more other devices and/or networks. For example, communication interface 328 may include at least one network interface that facilitates communication between customer assistance computing platform 324 and one or more other devices and/or networks (e.g., private network 320, public network 322, customer computing device 302, and/or other devices and networks).

Figure 4:
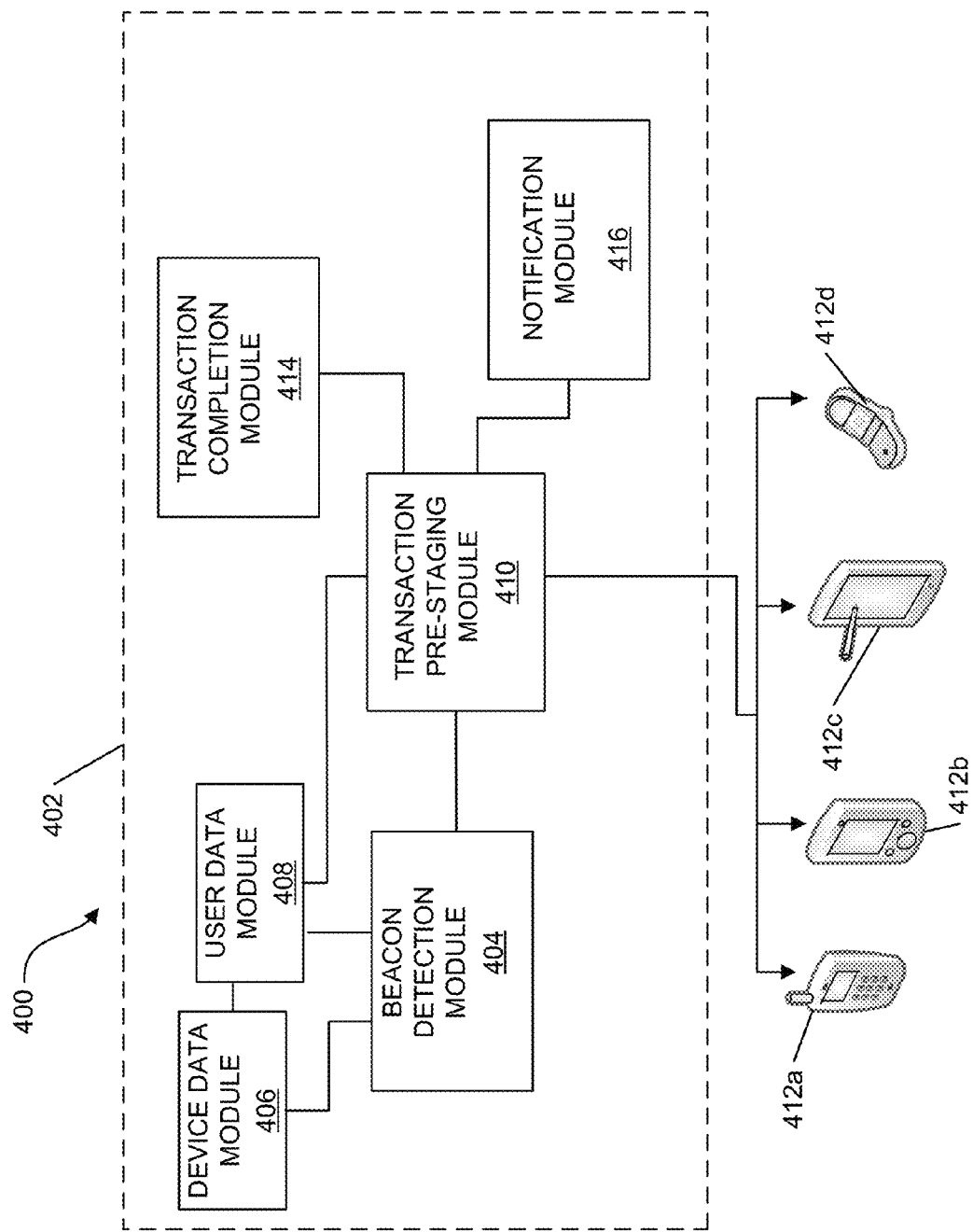
FIG. 4 illustrates one example location determination and user identification system according to one or more aspects discussed herein.

FIG. 4 illustrates one example location determination and user identification system 400 according to one or more aspects described herein. In some examples, the location determination and user identification system 400 may be part of, internal to or associated with an entity 402. The entity 402 may be a corporation, university, government entity, and the like. In some examples, the entity 402 may be a financial institution, such as a bank. Although various aspects of the disclosure may be described in the context of a financial institution, nothing in the disclosure shall be construed as limiting the location determination and user identification system to use within a financial institution. Rather, the system may be implemented by various other types of entities.

Further, some aspects of the location determination and user identification system 400 may be contained in one or more computing devices, servers, or the like. For instance, the location determination and user identification system 400 may include one or more modules that may be implemented in hardware and/or software configured to perform various functions within the system 400. One or more modules may be contained within the same physical device or may be housed in separate devices. Further, although one or more modules may be shown in FIG. 4 as within the entity 402, any of the modules may be located external to the entity 402 but may be associated with the entity. For instance, one or more modules may be associated with a personal computing device of a user. Accordingly, various functionality associated with the module may be performed at the personal computing device which may be located external to the entity but may be associated with the entity by way of a user associated with the device being associated with the entity 402, the device including or running an application, such as a mobile banking application, of the entity 402, and the like. Nothing in the disclosure should be viewed as limiting the one or more modules to a same physical location or a location within an entity.

Location determination and user identification system 400 may include a beacon detection module 404. The beacon detection module 404 may be implemented in hardware and/or software and may be configured to perform various functions within the system 400. For instance, the beacon detection module 404 may be configured to detect and/or receive a signal associated with one or more beacons, such as location beacons 314, 316, 318 in FIG. 3. The location beacons may be arranged within or in proximity to a location (e.g., a branch or banking center) and may be part of a proximity positioning system that may be used to identify a location of a computing device and, accordingly, a user associated with the computing device, as will be discussed more fully below.

The beacon detection module 404 may receive a signal emitted from one or more location beacons (such as location beacons 314, 316, 318 in FIG. 3) and may determine a location of the beacon and/or a personal computing device associated with a user that is within a predefined proximity of one or more locating beacons. For instance, if a personal computing device, such as one of devices 412a-412d is in a location that is within a predefined proximity of one or more location beacons emitting a signal, the personal computing device 412a-412d (e.g., via the beacon detection module 404) may detect the signal and determine, such as from the received signal, a location of the beacon and/or a location of the device. In some examples, an application on the personal computing device 412a-412d may be used to detect the signal from the beacon and/or determine a location of the beacon and/or personal computing device 412a-412d.

The signal received from the beacon and/or data associated with the signal (such as location data) may be transmitted to a device data module 406. The device data module 406 may be implemented in hardware and/or software configured to perform various functions within the system. For instance, the device data module 406 may receive the signal from the beacon or data associated therewith from the beacon detection module 404 and may determine a unique identifier associated with the personal computing device 412a-412d associated with the beacon detection module 404 that detected the beacon. That is, the device data module 406 may determine a unique identifier, such as a phone number associated with a smart phone 412a, an international mobile station equipment identity (IMEI), or other unique identifier associated with the personal computing device within the predefined proximity of the beacon.

The signal from the beacon detection module 404 and/or the device identifier from the device data module 406 may be transmitted to a user data module 404. In some examples, the user data module 408 may be located remotely from the beacon detection module 404 and/or the device data module 406. For instance, the user data module 408 may be located in, for example, a back office of a financial institution. The user data module 408 may be implemented in hardware and/or software configured to perform various functions within the system 400. For instance, the user data module 408 may receive data from the beacon detection module 404 associated with a location of the beacon and/or a location of the personal computing device detecting the beacon signal. The user data module 408 may also receive the unique identifier retrieved from the device data module 406 to determine a user associated with the device and, therefore, a location of the user associated with the device based on the location of the device.

In some arrangements, a user may register with the system 400. Registration with the system 400 may include registering a unique identifier associated with one or more personal computing devices of the user. Registration with the system 400 may also include providing identifying information associated with the user. For instance, a name, address, phone number, online or mobile banking user identification, and the like, may be provided in registering with the system. In some examples, the system 400 may obtain registration information directly from the user (e.g., via an online or other direct registration process). Additionally or alternatively, the system 400 may obtain some or all of the registration information from information a user provided to an online banking application, mobile banking application, or the like.

In some arrangements, the registration information may be stored in the user data module 408. Accordingly, upon receiving information associated with a beacon signal and/or a unique identifier associated with a personal computing device, the user data module 408 may determine or identify a user associated with the personal computing device. Thus, the fact that the device associated with the user has detected a beacon signal indicates that the device is within a predefined proximity of the beacon and, thus, the user is also (at least likely) within the same proximity of the beacon (e.g., has a physical presence at the location of the beacon). If the beacon is located within a particular location, such as a branch of a financial institution, this information may be used to determine when a user is within the branch (e.g., has a physical presence in the branch or banking center) and provide additional services, functionality, etc. to the user based on the identification of the user and determination of the location of the user based on the determined location of the personal computing device associated with the user.

One example of an additional service or functionality that may be provided based on the determined identification and location of the user may be completing one or more pre-staged transactions initiated by the user. For instance, a user may initiate one or more transactions from a computing device, such as one or more of computing devices 412a-412d. The user may initiate the transaction prior to arriving at a branch or banking center (e.g., from a location remote from the branch or banking center such as the user's home, office, or the like). Upon arriving at the banking center, the personal computing device of the user may detect a signal from a location beacon, as discussed more fully herein, and, based on the detection of the signal, the identity and location of the user may be determined. This information may then be used to facilitate completion of the one or more pre-staged transactions. These and various other examples will be discussed more fully below.

The location determination and user identification system 400 may include a transaction pre-staging module 410. The transaction pre-staging module 410 may be implemented in hardware and/or software configured to perform various functions within the system. For instance, the transaction pre-staging module 410 may receive data associated with one or more transactions that have been initiated or pre-staged by a user, such as via a personal computing device 412a-412d. In some examples, the transaction may be initiated by the user prior to the user arriving at the branch or banking center at which the location beacon is located. For instance, the user may initiate one or more transactions from his or her home, office, or other location remote from the branch or banking center. Further, the user may initiate the transaction from a personal computing device 412a-412d that is a mobile device, such as smart phone 412a, personal digital assistant (PDA) 412b, tablet computing device 412c or cell phone 412d. In some examples, the user may initiate the transaction from a personal computing device, such as a desktop computer, that might not be considered a mobile device.

Various transactions and/or types of transactions may be initiated and stored in the transaction pre-staging module 410. For instance, the user may initiate a withdrawal of funds, deposit of funds, check cashing or deposit transaction, purchase of money order, exchange of foreign currency, request or purchase of a certified check, and the like. In some examples, initiation of the transaction may include inputting an amount of the transaction, date of transaction, account associated with the transaction, and the like. Further, initiation of some transactions may include scanning one or more instruments, such as a check, for deposit, cashing, or the like. The instrument may be scanned via the user's personal computing device 412a-412d. In some arrangements, the transaction may include the pick-up of one or more items at the banking center. For instance, in the purchase of a money order, the transaction may be initiated by the user and the money order may be picked up, as discussed more fully herein, by the user at the banking center.

The transactions associated with the transaction pre-staging module 410 may be associated with a plurality of users. Accordingly, once a user is identified, the system may determine whether any pre-staged or initiated transactions are available in the transaction pre-staging module 410.

In some arrangements, the transaction pre-staging module 410 may be associated with and/or located at the entity 402. For instance, the transaction pre-staging module 410 may be located in, for example, a back office of a financial institution.

The location determination and user identification system 400 may further include a transaction completion module 414. The transaction completion module 414 may be implemented in hardware and/or software configured to perform various functions within the system. For instance, the transaction completion module 414 may receive data associated with an identity of a user (e.g., from user data module 408) and/or one or more pre-staged transactions associated with the user (e.g., from transaction pre-staging module 410) and may facilitate processing or completion of the transaction. For instance, upon determining that the user has a physical presence at the banking center (e.g., by detection of the location beacon signal by the personal computing device of the user and determining the identity of the user) the transaction completion module 414 may process and/or complete the transaction based on the determined location information of the user (e.g., the user's physical presence at the banking center).

For example, if a pre-staged transaction includes deposit of one or more checks, the checks may be scanned or images of the checks captured and transmitted the system prior to the user's arrival at the banking center. Upon establishing a physical presence of the user at the banking center, the checks may be further processed to complete the deposit (e.g., credit the account, and the like) and the user may simply drop off the physical checks while at the banking center. In another example, the user may initiate a transaction to purchase foreign currency. The transaction may be pre-processed and, upon establishing a physical presence of the user at the banking center (e.g., by the personal computing device detecting the location beacon, determining the location of the personal computing device and identity of the associated user, and the like) the purchase may be completed and the user may be directed to a particular location to pick up the foreign currency.

In some arrangements, no funds may be deposited or withdrawn from any of the user's accounts based on the pre-staged transaction. Rather, the funds may be withdrawn or deposited upon determination of the user having a physical presence within the banking center (based on the determined location of the personal computing device of the user). Accordingly, in the example provided above, the amount of the checks to be deposited might not be shown in an account balance until the user arrives at the banking center. With respect to the example of purchasing foreign currency, the funds being used to purchase the foreign currency might not be withdrawn from the user's account until the user arrives at the banking center.

The transaction completion module 414 may, in some examples, be associated with or located at the entity 402. For instance, the transaction completion module 414 may be located at a back office of the financial institution.

The location determination and user identification system 400 may further include a notification module 416. The notification module 416 may be implemented in hardware and/or software configured to perform various functions within the system. For instance, the notification module 416 may generate and/or transmit one or more notifications to a user. For example, upon processing of a pre-staged transaction (e.g., by the transaction completion module), the notification module 416 may generate a notification to the user indicating that the transaction has been completed. The notification may include balance information, amount of the transaction, date of the transaction, and the like. The notification may then be transmitted to the user (e.g., to the personal computing device 412 of the user). In some arrangements, the notification may include further instructions regarding the transaction. For example, if the user is conducting a transaction in which the user is acquiring an item, such as a money order, foreign currency, certified check, or the like, the notification may include instructions for obtaining the item. In another example, if the user is dropping off an item, such as a check being deposited or cashed, the notification may include instructions for the location to drop off the item.

In some examples, the notification module 416 may generate one or more notifications to the banking center or financial institution. For instance, the notification module may generate and provide notifications to the financial institution of the pre-staged transaction, status of the user, and the like.

FIGS. 5A-5D depict an illustrative event sequence for utilizing a location determination and user identification system in accordance with one or more aspects discussed herein. The example shown in FIGS. 5A-5D is merely one example sequence and various other steps, processes, or the like, may be included in a sequence without departing from the invention.

Referring to FIG. 5A, at step 1 transaction initiation information may be received by a transaction pre-staging module 410. The transaction initiation information may be received from a user, such as from a personal computing device of a user. As discussed above, the transaction initiation information may include a type of transaction, amount of transaction, date of transaction, location of completion of transaction (e.g., branch or banking center at which the transaction will be completed), account associated with the transaction, and the like. The transaction initiation information may be received from a user prior to the user entering the branch or banking center at which the transaction will be completed. For instance, the user may initiate or pre-stage the transaction at home, office, or other location. In some arrangements, the transaction may be initiated via an application, such as a mobile banking application, online banking application, or the like, associated with the financial institution.

At step 2, the initiated transaction may be placed in a queue in the transaction pre-staging module 410 to await further processing or completion upon the user's arrival at the branch or banking center. The transaction pre-staging module may include a plurality of transactions associated with the user and/or other users. In some arrangements, the transaction pre-staging module may store or hold a transaction for completion or processing for a predetermined period of time. For instance, a transaction may remain in the queue for one day, one week, one month, or the like. Upon expiration of that time period, in some arrangements, the pre-staged transaction may be removed or deleted and the user may have to re-initiate the transaction if desired.

At step 3, a signal may be emitted from a beacon, such as location beacon 314 in FIG. 3. The signal may include data identifying the beacon and/or a location of the beacon. In some examples, the beacon may be located in a branch or banking center of a financial institution.

At step 4, the signal emitted by the beacon may be detected, such as by a personal computing device 412. As discussed above, the signal emitted by the beacon may be a low-power radio signal such that detection of the signal might be possible when the personal computing device is within a predefined proximity of the beacon. Accordingly, the personal computing device must be near to the beacon in order to detect the signal.

Based on the received signal, a location of the beacon, and, thus, an approximate location of the personal computing device, may be determined in step 5. For instance, in some examples, the personal computing device may include an application configured to communicate with the beacon and/or receive and/or provide information associated with the beacon, location, and the like, to a system associated with an entity, such as a financial institution. Example applications may include online banking applications and/or mobile banking applications. Accordingly, the application may detect the signal associated with the beacon and determine a location of the beacon (and thus an approximate location of the personal computing device). Determining the location of the beacon may be based on records stored on the personal computing device, or accessible via the online banking application or mobile banking application, identifying locations of beacons. For instance, the location of beacons in each branch of the financial institution may be accessible via the online banking application or mobile banking application. This information may be compared with data associated with the signal to identify the location of the beacon and, thus, the location of the personal computing device.

Although the example above includes identifying the location of the beacon and/or the personal computing device by the personal computing device (or application associated therewith), in some arrangements, the signal or data associated with the signal, may be transmitted from the personal computing device to another computing device or server in order to identify the location. For instance, the signal or data associated therewith may be transmitted to a server at a back office of a financial institution, such as customer assistance computing platform 324 in FIG. 3. The location of the beacon, and approximate location of the personal computing device, may then be determined at the remote server or platform using processes similar to those discussed above.

Figure 5B:
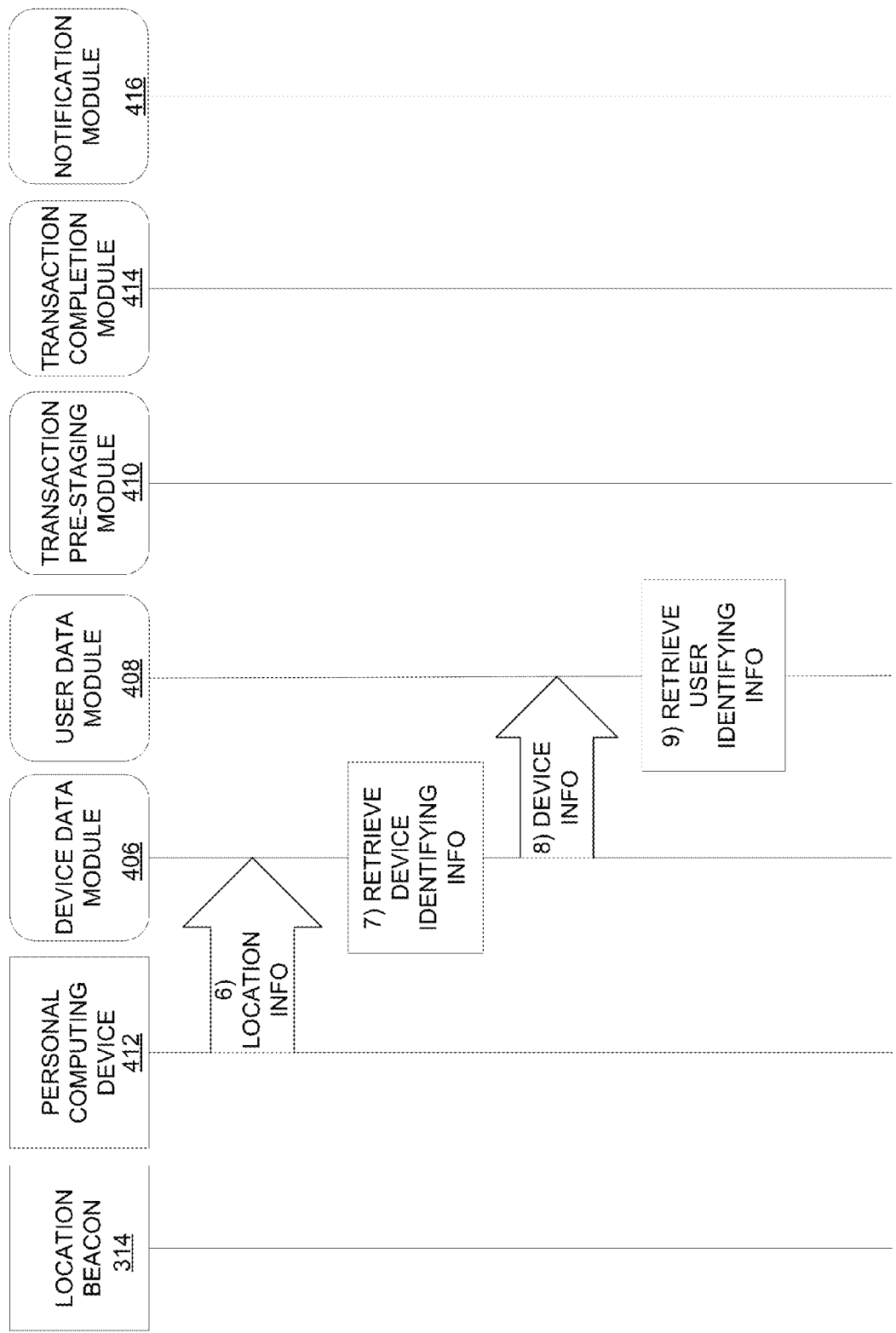

With reference to FIG. 5B, at step 6, the determined location of the beacon (location information) may be transmitted, for instance to a device data module 406, to retrieve device identifying information in step 7. As discussed above, device identifying information may include IMEI of the device, and the like.

The identifying information retrieved associated with the personal computing device, may be transmitted, for instance, to the user data module 408 in step 8. The user data module 408 may receive the information and use, for instance at least the device identifying information, to identify a user associated with the personal computing device. Information associated with the identified user may be retrieved in step 9.

Referring to FIG. 5C, at step 10, the location information (e.g., location of the beacon and personal computing device detecting the beacon) may be transmitted to a transaction pre-staging module 410. At step 11, the information associated with the identified user may be transmitted to the transaction pre-staging module. Based on the determined location of the personal computing device of the user, and the determined identity of the user, the system may determine or establish that the user has a physical presence at the branch or banking center and, in step 12, may identify one or more transactions associated with the user. In some examples, identifying the one or more transactions may include identifying one or more transactions that have been initiated by the user or for completion by the user. The identified transactions may also be sorted by location, such that a user may have initiated multiple transactions for completion at one or more different banking centers. Accordingly, in some examples, the system may identify initiated transactions designated for completion or processing at the location at which the personal computing device of the user detected the location beacon signal.

In step 13, the identified transactions and associated information may be transmitted to a transaction completion module 414. In step 14, the transaction completion module may process the initiated identified transactions and may complete the transaction(s) or facilitate completion of the transaction(s). For instance, the transaction completion module 414 may complete a transaction based on the user's determined presence (e.g., complete a deposit, or the like) or may facilitate completion of a transaction (e.g., by making items associated with the transaction, such as a money order, foreign currency, or the like) available for pick up by the user.

Figure 5D:
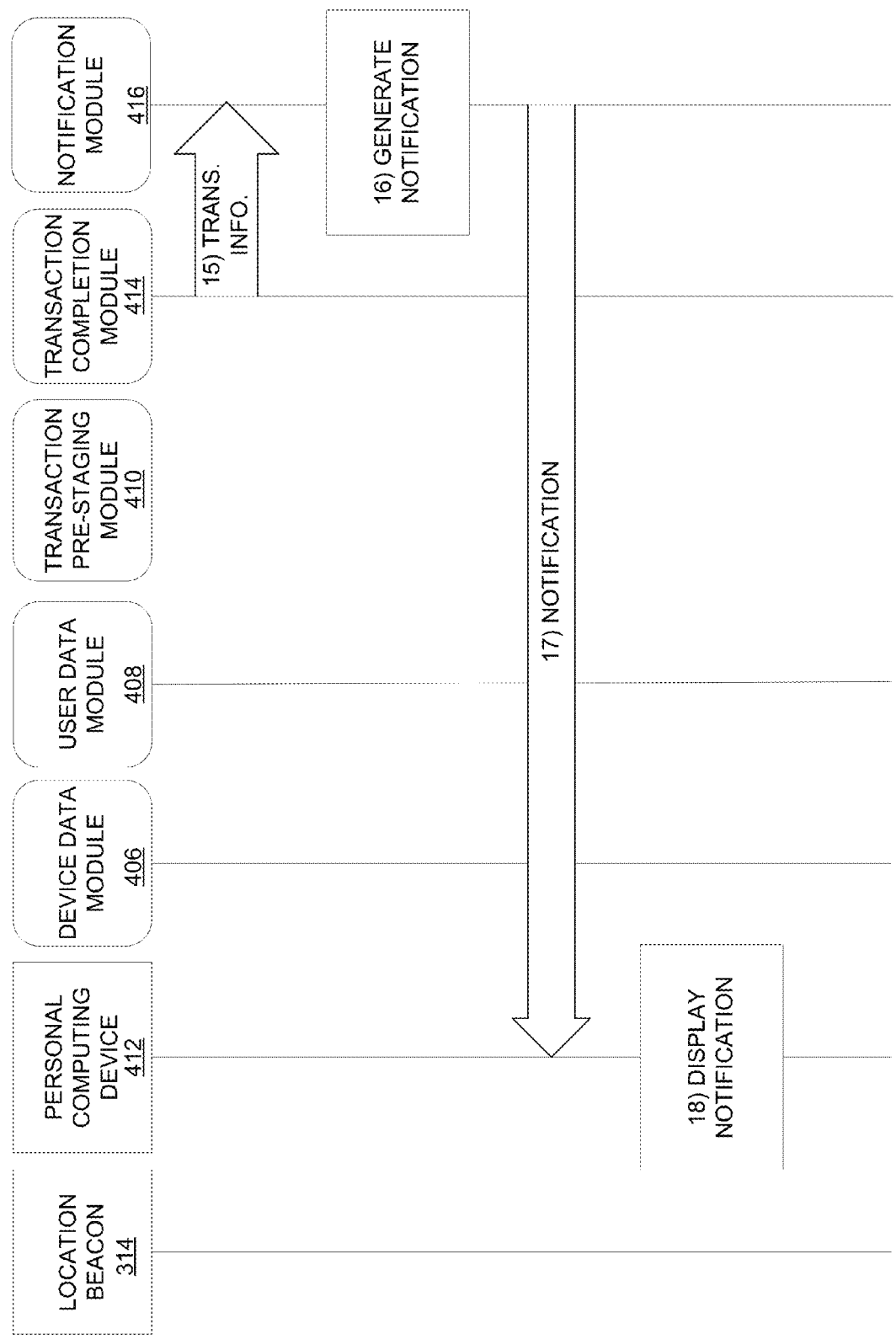

With reference to FIG. 5D, in step 15, the processed transaction information may be transmitted to a notification module 416. The notification module may generate a notification of the completion or further processing of the transaction in step 16. The notification may include an amount of the transaction, status of the transaction (e.g., completed, awaiting pick up, awaiting drop off, or the like), date of the transaction, type of transaction, update account balance information, and the like. In step 17, the notification may be transmitted to the personal computing device of the user. In some arrangements, the notification may be transmitted to the same personal computing device from which the user initiated the transaction. In other examples, the notification may be transmitted to a different personal computing device of the user (e.g., the transaction may be initiated by a user's work computer and the notification may be transmitted to the user's smart phone). In step 18, the notification may be displayed on the personal computing device of the user.

Various additional steps may be provided in this or other event sequences without departing from the invention. For instance, steps associated with providing requested items to the user, retrieving requested items from the user, and the like, as discussed herein, may be provided in this or other event sequences without departing from the invention.

FIG. 6 illustrates one example method of implementing the systems and arrangements discussed above. The steps described in FIG. 6 may be performed in a different order than the order presented herein and nothing in the specification or figures should be viewed as limiting the order of the steps to the order described herein.

FIG. 6 illustrates one example method of processing or completing a pre-staged transaction based on a determined location and identity of a user according to one or more aspects discussed herein. In step 600, transaction initiation information may be received. As discussed above, the transaction initiation information may be received from a computing device of a user, such as personal computing device 412 in FIG. 4. The transaction initiation information may be received (e.g., by a transaction pre-staging module 410 in FIG. 4) via an application, such as a mobile banking application, online banking application, or the like.

In step 602, the initiated transaction is queued in the system. For instance, the initiated transaction may be pre-processed or partially completed (e.g., various processing steps may be conducted, analysis and/or evaluation of the transaction (e.g., whether sufficient funds are available, or the like), and/or any other steps involved in preparing for completion of the initiated transaction). However, the initiated transaction may be pre-processed, but not fully processed or completed, until a user arrives at a banking center or branch, as discussed herein. Accordingly, the pre-processed, pre-staged transaction may be partially completed and awaiting arrival of the user for completion or further processing.

In step 604, a signal from a location beacon may be detected by a personal computing device of the user. As discussed above, the signal may be a low-power radio signal that may only be detectable when the detecting device (e.g., the personal computing device) is within a predetermined proximity of the beacon, which may be a relatively small distance. In step 606, the location of the beacon and, thus, the personal computing device, may be determined. The location may be determined in various ways, as discussed above.

In step 608, a user associated with the personal computing device may be identified. As discussed above, the user may be identified based on the unique identifier associated with the personal computing device, registration records or information, online or mobile banking information provided, or the like. Because of the user's association with the personal computing device, and the determined location of the personal computing device, it may be determined or established that the user has a physical presence at the location of the personal computing device (e.g., a branch or banking center of a financial institution at which the location beacon is located).

In step 610, a determination is made as to whether, based on the determined location and the identified user, one or more pre-staged transactions are available for processing. For instance, the system may compare location information and/or user information to identify any pre-staged transactions associated with the user and/or pre-staged transactions associated with the user that are identified to be completed or further processed at the determined location (e.g., the branch or banking center). If there are no transactions for the location or user, the system may continue to store the pre-staged transactions for further processing in step 612. In some examples, the pre-staged transactions may be stored for a predefined period of time (e.g., one day, two days, one week, one month, or the like). At the end or expiration of the predefined period of time, the system may remove or delete the pre-staged transaction(s) and the user may have to initiate the transaction again in order to complete the transaction.

If, in step 610, there one or more transactions associated with the location and/or user are identified as available for processing, the transactions associated with the user (and, in some arrangements, the determined location) may be identified in step 614. In step 616, the one or more transactions identified in step 614 may be further processed or completed. For instance, the transactions may be transferred to, for example, a transaction completion module (e.g., module 414 in FIG. 4) for further processing and/or completion. In some arrangements, the authorization for the further processing or completion may be based on the determined location and identity of the user (e.g., the established physical presence of the user at the branch or banking center). For instance, the system may rely on only the determined location and identity of the user to authorize completion of the transactions (e.g., no additional identification or authorization may be required in some examples).

Upon completion or further processing of the transaction, a notification may be generated and transmitted to the user in step 618. The notification may be transmitted to the personal computing device of the user that detected the beacon signal, and/or another computing device of the user. Further, the device to which the notification is transmitted may be the device from which the transaction was initiated or may be a different computing device.

The notification may include a status of the transaction (e.g., complete, ready for pick up, or the like), as well as an amount of the transaction, any costs associated with the transaction, type of transaction, any further instructions for completion as needed, or the like. In some examples, the notification may include further instructions regarding completion of the transaction. For instance, the notification may include a location at which the user may pick up an item (e.g., a certified check, money order, or the like) or a location at which the user may drop off an item (e.g., cash for deposit, physical check for cashing or deposit, or the like). In some examples, these items may be maintained in a secure location or container. The notification may include instructions regarding a particular banking associate who may assist in obtaining the items, an access code or identification number that may be used to access the secure location or container, or the like.

Figure 7:
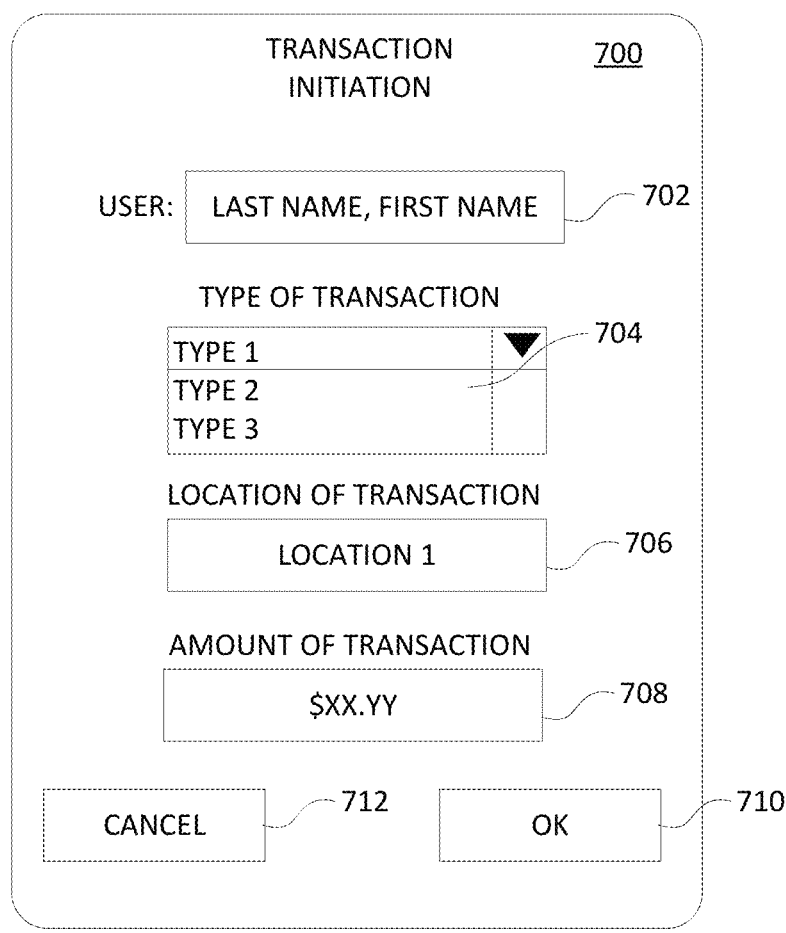
FIG. 7 illustrates an example user interface for initiating or pre-staging a transaction according to one or more aspects described herein.

FIG. 7 illustrates one example user interface 700 that may be used to initiate a transaction according to one or more aspects described herein. Interface 700 includes field 702 in which the name of the user is provided. In field 704, a type of transaction may be identified. In some arrangements the type of transaction may include withdrawal, deposit (cash or check), check cashing, purchase of money order, foreign currency exchange or purchase, acquiring a certified check, and the like. Various other types of transactions may be initiated, processed and/or completed by the system without departing from the invention.

The interface 700 further includes field 706 in which a location of further processing and/or completion of the transaction may occur. In some examples, the user may identify a branch or banking center at which they intend to complete the transaction. In other examples, the user might not provide location information and the transaction may be completed or processed at any branch or banking center.

Field 708 identifies an amount of the transaction. Various other fields and/or information may be provided in interface 700, or other interfaces associated with initiating a transaction, without departing from the invention. For instance, an account or account number associated with the transaction may be identified.

Once the desired information has been provided by the user, the user may select "OK" option 710. Selection of option 710 may cause the system to pre-process and/or pre-stage the transaction. That is, the transaction may undergo a partial processing in order to stage the transaction for completion upon a determination that the user has arrived or has a physical presence at a branch or banking center (e.g., as determined by detection of the location beacon signal by the personal computing device of the user).

Alternatively, the user may select "CANCEL" option 712 in order to cancel the transaction being initiated or clear the entries made.

Figure 8A:
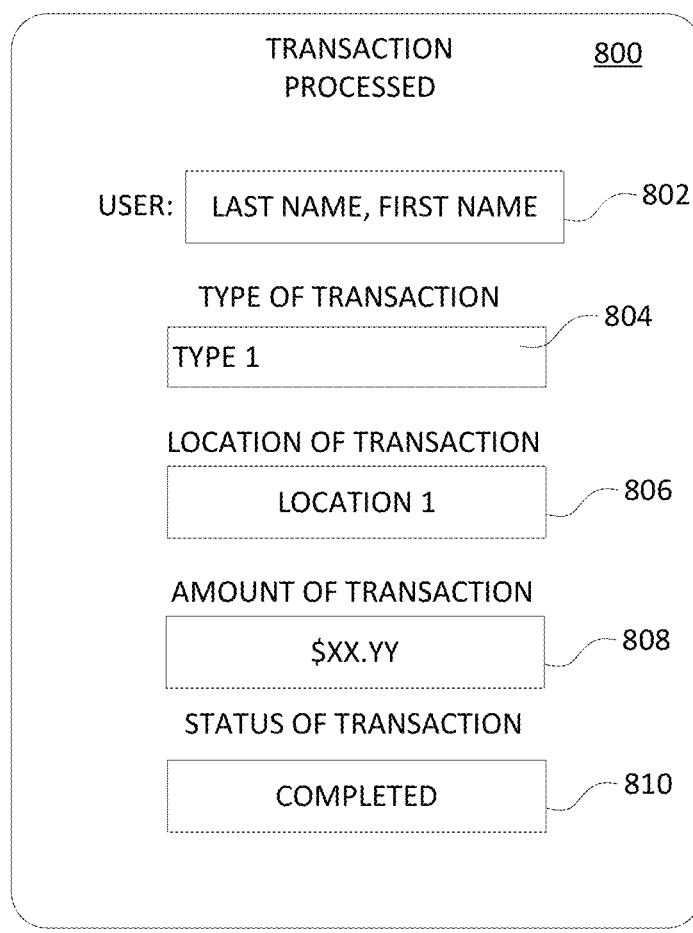
FIGS. 8A and 8B illustrate example user interfaces for providing a notification to a user that a pre-staged transaction has been processed and/or completed according to one or more aspects described herein.
Figure 8B:
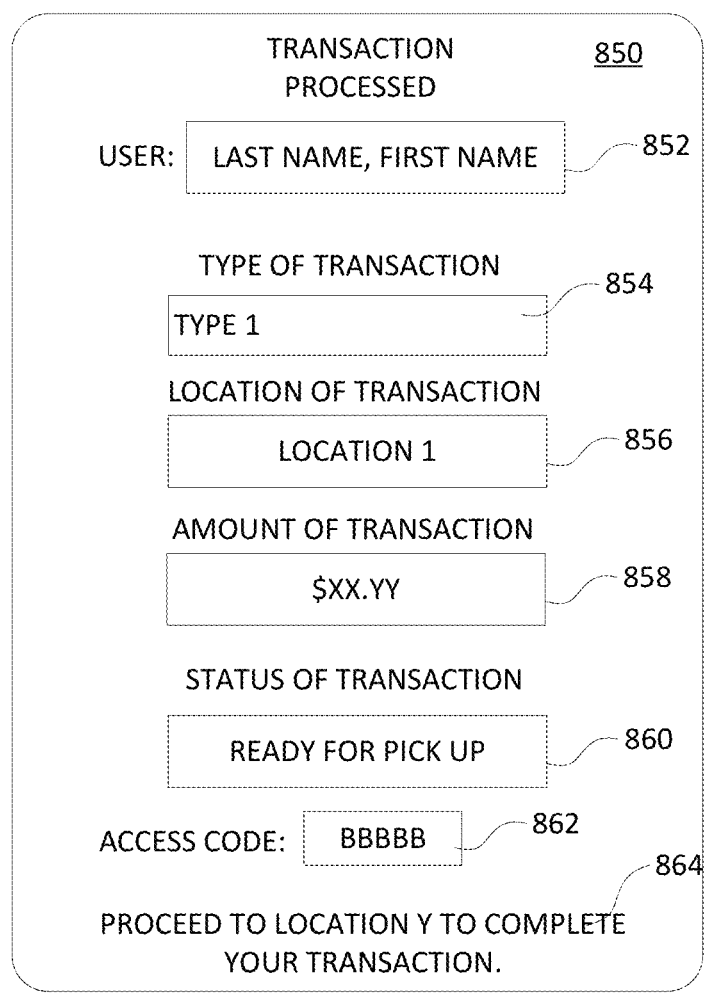

FIGS. 8A and 8B are example user interfaces including notifications that may be transmitted to a user according to one or more aspects described herein. FIG. 8A illustrates one example interface 800 including a notification indicating that a transaction is complete. The interface 800 includes field 802 in which the name of the user associated with the transaction is displayed. Fields 804, 806 and 808 provide information associated with the transaction. Accordingly, the user may review those fields to confirm that the information is correct. Various other information fields may be included in the notification without departing from the invention. For instance, an account or account number associated with the transaction may be identified, an updated account balance may be identified, a confirmation number or other unique identifier associated with the transaction, and the like.

Field 810 further includes a status of the transaction. For instance, as shown in FIG. 8A, the status of the transaction may be "completed." Accordingly, the pre-staged transaction may have been processed upon determining or establishing that the user has a physical presence at the branch or banking center of the financial institution and the transaction may now be consider completed.

FIG. 8B illustrates one example user interface 850 including a notification that the transaction has been processed and is ready for completion but awaiting further action by the user. The interface 850 includes field 852 in which the user associated with the transaction may be identified. Fields 854, 856, and 858 provide information associated with the transaction. Various other information fields may be included in the notification without departing from the invention. For instance, an account or account number associated with the transaction may be identified, an updated account balance may be identified, confirmation number or other unique identifier associated with the transaction, and the like.

Field 860 indicates the status of the transaction. As shown in FIG. 8B, the status of the transaction shown is "ready for pick-up." Accordingly, the user is aware that additional processing has been performed and that the transaction items are ready for pick up by the user. For instance, the user may be picking up a certified check, money order, or the like.

In some examples, the item(s) ready for pick up may be held in a secure location or secure container. Accordingly, the notification may include an access code 862 or other information the user may use to gain access to the secure location or secure container. For instance, if the transaction involved the pick-up of an item, such as a certified check, money order, foreign currency, cash withdrawal, or the like, the item may be held in a secure location or container until the user arrives to pick it up. The notification transmitted to the user may include a code, password, or the like, to access the secure location or container. For instance, the item may be held in a secure lockbox with a keypad entry system. The user may enter the code 862 received in the notification into the keypad and the lockbox may open, permitting the user to remove the item. In some arrangements, the access code may be unique to the transaction (e.g., each transaction may have a different code) and/or unique to a user (e.g., the user may be assigned or may select a code that may be used to gain access on one or more occasions for one or more transactions). Further, the financial institution may have a plurality of secure areas or containers that may hold items for various transactions for various different users at any given time.

Interface 850 may further include additional instructions to the user to complete the transaction in region 864. For instance, region 864 may include a location at which the user may pick up or collect the item associated with the transaction, a particular banking associate to whom the user should speak to complete the transaction, or the like.

Below are various example arrangements in which the location determination and user identification system may be implemented. The arrangements discussed below are merely some example arrangements and should not be viewed as limiting the disclosure in any way. Various other arrangements may be implemented or used without departing from the invention.

As discussed above, the location determination and user identification system may implement proximity positioning systems, or features associated therewith, to identify a user and determine a location of a user based on a determined location of a personal computing device associated with the user. Additional services and/or functionality may then be provided to the user and/or a financial institution or other entity implementing the system, based on this information.

For example, as discussed above, one or more transactions may be initiated or pre-staged by a user or on behalf of a user. Upon the system determining that a user has a physical presence at a particular location (e.g., based on a personal computing device detecting a location beacon signal, a location determination of the personal computing device being made based on the signal or data associated therewith, and the identity of a user associated with the personal computing device being determined) the initiated or pre-staged transaction(s) may be processed and/or completed. In some examples, the user may pick up one or more items associated with the transaction (e.g., money order, cash withdrawal, foreign currency, or the like) at the banking center. In other examples, the user may drop off one or more items associated with the transaction (e.g., checks for deposit or cashing) at the banking center.

In one example arrangement, a user may initiate or pre-stage a withdrawal of funds from a particular account. The transaction may be pre-staged or initiated from a personal computing device of the user. Upon the user entering the banking center, the personal computing device of the user may detect a signal from a location beacon and a location of the personal computing device may be determined. The identity of the user associated with the personal computing device may then be determined and the pre-staged or initiated transaction may be further processed (e.g., account balance may be reduced by the amount of the withdrawal, funds withdrawn may be placed in a secure lockbox or transmitted to a particular banking associate, or the like). A notification may be transmitted to the user indicating that the initiated or pre-staged transaction has been processed and that the user may pick up the withdrawn funds at a particular location (e.g., secure lockbox) or from the identified banking associate.

In another example arrangement, a user may desire to deposit a plurality of checks into an account. The user may initiate or pre-stage the transaction from a personal computing device (e.g., via an online or mobile banking application) and may scan or otherwise upload or transmit images of the checks being deposited. Accordingly, the system may pre-process the deposit, including identifying amount of each check, confirming no errors exist on the face of the check, or the like. Upon the user's arrival at the banking center, the check deposits may be completed (e.g., the account may be credited or provisionally credited with the amount of the checks being deposited) and the user may receive a notification that the deposit has been processed. The notification may further include a location of a drop box or other container or location where the user may drop off the checks being deposited. In some examples, upon the financial institution recognizing receipt of the physical checks, an additional notification may be transmitted to the user indicating that the checks were received and/or the transaction has been completed.

The arrangements described herein may enable a user to conduct various transactions outside of normal business hours that would typically be performed only during business hours. That is, the arrangements discussed herein may enable 24 hour access to various transactions. For instance, a user may request a new or replacement credit or debit card. The card may be generated and placed in a lockbox at the banking center. Upon the user's arrival at the banking center (as determined by the personal computing device of the user detecting the location beacon signal), a notification may be transmitted to the personal computing device indicating a location of a lockbox containing the new card and an access code to access the lockbox. Similar arrangements may be used to obtain foreign currency, money orders, or the like. That is, the transactions to obtain the items may be initiated or pre-staged by the user or someone acting on behalf of the user prior to the user's arrival at the banking center. This may reduce the amount of time the user spends at the banking center, making transactions of various types more efficient for the user.

Although various arrangements discussed herein include the determination of a location of the personal computing device of a user and identity of a user as sufficient information to authenticate the user and/or authorize completion of the transaction, in some examples, additional identification and/or authentication information may be requested form the user prior to completing or authorizing completion of the transaction. For instance, the user may be asked to show photo identification or sign a signature pad to confirm the identity of the user. Various other types of information may be used to authenticate the user as desired. However, as discussed above, various examples require no additional authentication or identification. Rather, the determination of the location of the personal computing device within a predefined proximity of a location beacon at a banking center, and the determined identity of the user associated with the personal computing device, may be sufficient to authorize, process, and/or complete the transaction.

In some arrangements, one or more notifications may also be transmitted to the banking center. For instance, upon initiation of a transaction, a user may indicate an estimated time of arrival at the banking center. The banking center may receive a notification of this information to ensure that the transaction is pre-staged prior to that designated time. Further, in some examples, the user may permit the system to track a location of the user (e.g., using global positioning systems to track a location of a personal computing device of the user). Accordingly, the banking center and/or financial institution may receive one or more notifications indicating a location of the user, estimated or updated estimated time of arrival, and the like.

In still other examples, the notification transmitted to the user may include information associated with current conditions at the banking center. For example, if the banking center is busy or a particular banking associate is tied up or out of the office, a notification to the user may indicate this information to enable the user to be prepared for the conditions at the banking center.

Although several examples provided herein are discussed in the context of a financial institution, the system may be used with various entities. For instance, a user may pre-stage a purchase or return. Upon the user's personal computing device detecting a location beacon, the location and identity of the user may be determined. The transaction may be processed and, in some examples, the user may be directed to a particular sales associate or lockbox to pick up or drop off the items associated with the transaction.

Further, the arrangements discussed herein may include detection of a signal by a personal computing device and transmitting the signal, or data associated therewith, to another portion of the system or another device, to determine the location of the beacon and/or device, as well as the identity of the user associated with the device. However, in some arrangements, the personal computing device may be configured to determine the location of the beacon, and thus, the location of the personal computing device, based on the received signal (e.g. by matching a signal that may be unique to the beacon with a stored list of beacons and associated locations). Some or all aspects of this arrangement may be performed by one or more applications associated with the personal computing device, such as an online or mobile banking application. The application may then determine the identity of the user (e.g., with or without accessing other devices) and may transmit user information to another device or component of the system to provide the additional functionality, as discussed herein.

The various arrangements discussed herein aid in improving customer service experiences for a user, and providing efficient transaction processing.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
    pre-staging, at a first location, a plurality of transactions;
    receiving, by a location determination and user identification system having at least one processor, data associated with a signal detected by a personal computing device, the signal being emitted from a location beacon at a second location, the second location being a banking center of a financial institution and being different from the first location;
    determining, by the location determination and user identification system, a location of the personal computing device based on the received data associated with the signal emitted from the location beacon, wherein the location of the personal computing device is within a predefined proximity of the second location at which the location beacon is located;
    extracting, by the location determination and user identification system, a unique identifier associated with the personal computing device;
    determining, by the location determination and user identification system and based on the extracted unique identifier associated with the personal computing device, an identity of a user associated with the personal computing device located at the determined location;
    identifying at least one pre-staged transaction of the plurality of transactions that is associated with the identified user associated with the personal computing device;
    based on the determined location of the personal computing device being within the predefined proximity of the second location at which the location beacon is located and the determined identity of the user, authorizing the at least one identified pre-staged transaction for further processing, the authorizing being based on the determined location of the personal computing device being within the predefined proximity of the second location and the determined identity of the user and without additional authorization;

processing the at least one identified pre-staged transaction based on the authorization based on the determination of the location of the personal computing device being within the predefined proximity of the second location at which the location beacon is located and the determined identity of the user; and generating a notification indicating processing of the at least one identified pre-staged transaction.

2. The method of claim 1, further including:

based on the determined location of the personal computing device and the determined identity of the user, determining that the user has a physical presence at the determined location; and authorizing the at least one identified pre-staged transaction for further processing based on the determined physical presence of the user.

3. The method of claim 1, wherein processing the at least one identified pre-staged transaction includes completing the at least one identified pre-staged transaction.

4. The method of claim 1, wherein the at least one identified pre-staged transaction is pre-staged by the identified user.

5. The method of claim 4, wherein the at least one identified pre-staged transaction is pre-staged by the identified user via the personal computing device.

6. The method of claim 4, wherein the at least one identified pre-staged transaction is pre-staged by the identified user via a computing device different from the personal computing device.

7. The method of claim 1, further including:

transmitting the generated notification to the personal computing device of the user.

8. The method of claim 7, wherein the notification further includes information associated with a location at which the user may complete the at least one identified pre-staged transaction.

9. The method of claim 8, wherein the location at which the user may complete the at least one identified pre-staged transaction includes a secure container containing one or more items associated with the at least one identified pre-staged transaction.

10. The method of claim 8, wherein the notification further includes an access code to access the secure container.

11. The method of claim 1, wherein authorizing the at least one identified pre-staged transaction for further processing is based only on the determined location of the personal computing device being within the predefined proximity of the second location and the determined identity of the user.

12. An apparatus, comprising:

at least one processor communicating via a communication interface; and a memory storing instructions that when executed by the at least one processor cause the apparatus to:

pre-stage, at a first location, a plurality of transactions;

receive data associated with a signal detected by a personal computing device, the signal being emitted from a location beacon at a second location, the second location being a banking center of a financial institution and being different from the first location;

determine a location of the personal computing device based on the received data associated with the signal emitted from the location beacon, wherein the location of the personal computing device is within a predefined proximity of the second location at which the location beacon is located;

extract a unique identifier associated with the personal computing device;

determine, based on the extracted unique identifier associated with the personal computing device, an identity of a user associated with the personal computing device located at the location;

identify at least one pre-staged transaction of the plurality of transactions that is associated with the identified user associated with the personal computing device;

based on the determined location of the personal computing device being within the predefined proximity of the second location at which the location beacon is located and the determined identity of the user, authorizing the at least one identified pre-staged transaction for further processing, the authorizing being based on the determined location of the personal computing device being within the predefined proximity of the second location and the determined identity of the user and without additional authorization;

process the at least one identified pre-staged transaction based on the authorization based on the determination of the location of the personal computing device being within the predefined proximity of the second location at which the location beacon is located and the determined identity of the user; and generate a notification indicating processing of the at least one identified pre-staged transaction.

13. The apparatus of claim 12, wherein the at least one identified pre-staged transaction is pre-staged by the identified user.

14. The apparatus of claim 13, wherein the at least one identified pre-staged transaction is pre-staged by the identified user via the personal computing device.

15. The apparatus of claim 13, wherein the at least one identified pre-staged transaction is pre-staged by the identified user via a computing device different from the personal computing device.

16. The apparatus of claim 12, further including instructions that, when executed, cause the apparatus to:

transmit the generated notification to the personal computing device of the user.

17. The apparatus of claim 16, wherein the notification further includes information associated with a location at which the user may complete the at least one identified pre-staged transaction.

18. The apparatus of claim 17, wherein the location at which the user may complete the at least one identified pre-staged transaction includes a secure container containing one or more items associated with the at least one identified pre-staged transaction.

19. The apparatus of claim 18, wherein the notification further includes an access code to access the secure container.

20. One or more non-transitory computer-readable media having instructions stored thereon that when executed by one or more computers cause the one or more computers to:

pre-stage, at a first location, a plurality of transactions;

receive data associated with a signal detected by a personal computing device, the signal being emitted from a location beacon at a second location different from the first location, the second location being a banking center of a financial institution;

determine a location of the personal computing device based on the received data associated with the signal emitted from the location beacon, wherein the location of the personal computing device is within a predefined proximity of the second location at which the location beacon is located;

extract a unique identifier associated with the personal computing device;

determine, based on the extracted unique identifier associated with the personal computing device, an identity of a user associated with the personal computing device located at the location;

identify at least one pre-staged transaction of the plurality of transactions that is associated with the identified user associated with the personal computing device;

based on the determined location of the personal computing device being within the predefined proximity of the second location at which the location beacon is located and the determined identity of the user, authorizing the at least one identified pre-staged transaction for further processing, the authorizing being based on the determined location of the personal computing device being within the predefined proximity of the second location and the determined identity of the user and without additional authorization;

process the at least one identified pre-staged transaction based on the authorization based on the determination of the location of the personal computing device being within the predefined proximity of the second location at which the location beacon is located and the determined identity of the user; and generate a notification indicating processing of the at least one identified pre-staged transaction.

\* \* \* \* \*